United States Patent
Sawada

Patent Number: 5,954,865
Date of Patent: Sep. 21, 1999

[54] HOT-MELT INK COMPOSITION

[75] Inventor: Hidemasa Sawada, Gifu, Japan

[73] Assignee: Brother Kogyo Kabushiki Kaisha, Nagoya, Japan

[21] Appl. No.: 08/823,207

[22] Filed: Mar. 24, 1997

[30] Foreign Application Priority Data

Mar. 27, 1996 [JP] Japan .................................. 8-072210

[51] Int. Cl.⁶ ............................................... C09D 11/12
[52] U.S. Cl. ..................... 106/31.29; 106/31.61
[58] Field of Search ............................. 106/31.29, 31.61

[56] References Cited

U.S. PATENT DOCUMENTS

| | | | |
|---|---|---|---|
| 3,653,932 | 4/1972 | Berry et al. | 106/31.29 |
| 4,390,369 | 6/1983 | Merritt et al. | 106/31.3 |
| 4,659,383 | 4/1987 | Lin et al. | 106/31.29 |
| 4,758,276 | 7/1988 | Lin et al. | 106/31.29 |
| 4,820,346 | 4/1989 | Nowak | 564/169 |
| 5,000,786 | 3/1991 | Matsuzaki | 106/31.3 |
| 5,124,719 | 6/1992 | Matsuzaki | 347/88 |
| 5,421,868 | 6/1995 | Ayalia-Esquilin et al. | 106/31.29 |
| 5,560,765 | 10/1996 | Sawada | 106/31.3 |
| 5,597,856 | 1/1997 | Yu et al. | 106/31.13 |
| 5,607,501 | 3/1997 | Fujioka | 106/31.3 |
| 5,662,736 | 9/1997 | Sakai et al. | 106/31.29 |
| 5,667,568 | 9/1997 | Sacripante et al. | 106/31.29 |
| 5,688,312 | 11/1997 | Sacripante et al. | 106/31.29 |

FOREIGN PATENT DOCUMENTS

| | | |
|---|---|---|
| A-58-108271 | 6/1983 | Japan . |
| A-59-22973 | 2/1984 | Japan . |
| A-61-83268 | 4/1986 | Japan . |
| A-62-48774 | 3/1987 | Japan . |
| A-62-295973 | 12/1987 | Japan . |
| A-2-167373 | 6/1990 | Japan . |

*Primary Examiner*—Helene Klemanski
*Attorney, Agent, or Firm*—Oliff & Berridge, PLC

[57] ABSTRACT

A hot-melt ink composition, which is solid at room temperature, used for hot-melt ink-jet recording, rises a wax component having a melting point of from to 50° C. to 150° C., an amide resin and a colorants and the wax component has at least one of a bisamide wax and a maleic anhydride modified wax.

16 Claims, 1 Drawing Sheet

HOT-MELT INK COMPOSITION

BACKGROUND OF THE INVENTION

1. Field of the Invention

This invention relates to a hot-melt ink composition used in ink-jet recording apparatus. More particularly, it relates to a hot-melt ink composition used when ink is heated to melt under conditions of a higher temperature than room temperature to make a record.

2. Description of the Related Art

As ink-jet recording systems, various systems are employed, e.g., what is called an electric field control system, in which electrostatic attraction is utilized to eject ink; what is called a drop on-demand system (or pressure pulse system), in which vibratory pressure of a piezoelectric device is utilized to eject ink; and what is called a thermal ink-jet system, in which a pressure produced by bubbles formed and grown by high heat is utilized to eject ink. These systems can provide very highly precise printed images.

In these ink-jet recording systems, water-based inks employing water as a main solvent and oil-based inks employing an organic solvent as a main solvent are commonly used. Printed images obtained using the water-based inks have a poor water resistance in general. On the other hand, the use of oil-based inks can provide printed images having a good water resistance.

However, these water-based inks and oil-based inks are liquid at room temperature, and hence have had disadvantages that feathering tends to occur when images are printed on recording paper and that no sufficient print density can be obtained. Also, because the inks are liquid, they tend to cause formation of deposits to cause a great lowering of the reliability of ink-jet recording systems.

In order to overcome such disadvantages of the conventional inks of a solution type, what is called hot-melt oil-based ink-jet recording ink compositions, which are solid at room temperature, are proposed. U.S. Pat. No. 3,653,932 discloses an ink containing a dialkyl sebacate. U.S. Pat. No. 4,390,369 and Japanese Patent Application Laid-open No. 58-108271 disclose an ink containing a natural wax. Japanese Patent Application Laid-open No. 59-22973 discloses an ink containing a stearic acid. Japanese Patent Application Laid-open No. 61-83268 discloses an ink containing an acid or alcohol having 20 to 24 carbon atoms and a ketone having a relatively high melting point. Japanese Patent Application Laid-open No. 62-48774 discloses an ink containing a thermosetting resin having a high hydroxyl value, a solid organic solvent having a melting point lower than 150° C. and a small quantity of a dye substance. U.S. Pat. Nos. 5,000,786 and U.S. Pat. No. No. 5,124,719 disclose an ink comprised of a colorant, a first solvent which is solid at room temperature and capable of liquefying upon heating to a temperature higher than the room temperature and a second solvent capable of dissolving the first solvent and being highly volatile when turns liquid. Also, Japanese Patent Application Laid-open No. 62-295937 discloses an ink containing a synthetic wax having a polar group and a dye soluble in the wax.

However, none of these hot-melt ink compositions have well satisfied fundamental performances required in inks (stated specifically, ink transparency, color sharpness and so forth) and good print quality. In particular, those having transparency and adhesive properties good enough to be usable for OHPs (overhead projectors) have not been available.

SUMMARY OF THE INVENTION

The present invention was made in order to solve the above problems. Accordingly, an object of the present invention is to provide a hot-melt ink composition satisfying fundamental performances required in inks and a good print quality, having transparency and adhesive properties good enough to be usable for OHPs, and can form sharp colors most suited for hot-melt ink-jet recording.

To achieve the above object, the present invention provides a hot-melt ink composition which is solid at room temperature, used for hot-melt ink-jet recording; the ink composition comprising a wax component having a melting point of from 50° C. to 150° C., an amide resin and a colorant; the wax component having at least one of a bisamide wax and a maleic anhydride modified wax.

This and other objects, features and advantages of the present invention are described in or will become apparent from the following detailed description of the invention.

DETAILED DESCRIPTION OF THE INVENTION

Figure 1:
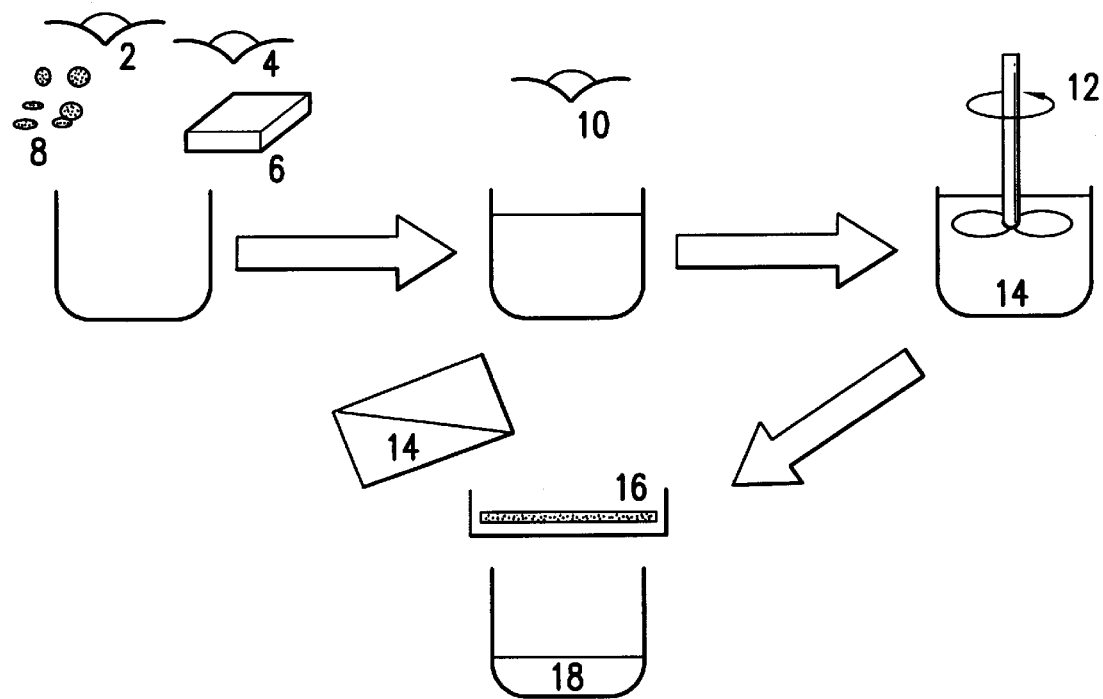
FIG. 1 illustrates a process for preparing the hot-melt ink composition of the present invention.

The hot-melt ink composition of the present invention is, as mentioned above, a hot-melt ink composition which is solid at room temperature, used for hot-melt ink-jet recording, and which contains a wax component having a melting point of from 50° C. to 150° C., an amide resin and a colorant. The wax component has at least one of a bisamide wax and a maleic anhydride modified wax.

In the present invention, a wax component stable to heat and having a melting point of from 50° C. to 150° C., is used, which constitutes the main material of the ink composition and governs the properties such as thermal properties and viscosity of the ink composition. Especially, in the present invention, at least one of a bisamide wax and a maleic anhydride modified wax is contained as the wax component.

Thus, the use of at least the bisamide wax as the wax component brings about an increase in clearness and adhesive properties of the ink composition itself and an improvement in the quality of prints on OHP sheets. Hence, when images are actually printed using the hot-melt ink composition containing the bisamide wax, not only sharp images with a good print quality can be formed on usual printing paper but also sharp and transparent images with a good print quality can be formed on OHP sheets.

The use of at least the maleic anhydride modified wax as the wax component brings about an improvement in wettability of the ink composition itself to OHP sheets and an improvement in the quality of prints on OHP sheets. Hence, when images are actually printed using the hot-melt ink composition containing the maleic anhydride modified wax, not only sharp images with a good print quality can be formed on usual printing paper but also sharp and transparent images with a good print quality can be formed on OHP sheets.

The use of the bisamide wax and maleic anhydride modified wax as the wax component in combination also brings about an improvement in transparency of the ink composition itself, in addition to the advantages obtained when either wax is used, and an improvement in the quality of prints on OHP sheets. Hence, when images are actually printed using the hot-melt ink composition containing both the bisamide wax and the maleic anhydride modified wax, not only sharp images with a good print quality can be formed on usual printing paper but also sharper and more transparent images with a good print quality can be formed on OHP sheets.

As preferable examples of the bisamide wax, it may include methylenebisstearic acid amide (BISAMIDE, available from Nippon Kasei Chemical Co., Ltd.), ethylenebisstearic acid amide (SLIPAX E, available from Nippon Kasei Chemical Co., Ltd.), ethylenebisisostearic acid amide (SLIPAX I, available from Nippon Kasei Chemical Co., Ltd.), ethylenebishydroxystearic acid amide (SLIPAX H, available from Nippon Kasei Chemical Co., Ltd.), hexamethylenebisbehenic acid amide (SLIPAX ZHB, available from Nippon Kasei Chemical Co., Ltd.), hexamethylenebishydroxystearic acid amide (SLIPAX ZHH, available from Nippon Kasei Chemical Co., Ltd.), N,N'-distearyladipinic acid amide (SLIPAX ZSA, available from Nippon Kasei Chemical Co., Ltd.), N,N'-distearylsebacic acid amide (SLIPAX ZSS, available from Nippon Kasei Chemical Co., Ltd.), ethylenebisoleic acid amide (SLIPAX O, available from Nippon Kasei Chemical Co., Ltd.), hexamethylenebisoleic acid amide (SLIPAX ZHO, available from Nippon Kasei Chemical Co., Ltd.), N,N'-dioleyladipic acid amide (SLIPAX ZOA, Nippon Kasei Chemical Co., Ltd.), and N,N'-dioleylsebacic acid amide (SLIPAX ZOS, Nippon Kasei Chemical Co., Ltd.).

The maleic anhydride modified wax may include α-olefin maleic anhydride copolymers such as "POWAX" available from Nippon Oil Co., Ltd. and "DIACARNA30L" available from Mitsubishi Chemical Corporation.

In the present invention, as the wax component, a conventionally known wax having a melting point of from 50° C. to 150° C. may be used in addition to at least one of the bisamide wax and the maleic anhydride modified wax. Such a wax may include, e.g., petroleum waxes, preferably paraffin wax or microcrystalline wax; vegetable waxes, preferably candelilla wax, carnauba wax, rice wax or jojoba solid wax; animal waxes, preferably beeswax, lanolin or spermaceti; mineral waxes, preferably montan wax; synthetic hydrocarbon waxes, preferably Fischer-Tropsh wax or polyethylene wax; hydrogenated waxes, preferably hardened castor oil or hardened castor oil derivatives; modified waxes, preferably montan wax derivatives, paraffin wax derivatives, microcrystalline wax derivatives or polyethylene wax derivatives; higher fatty acid waxes, preferably behenic acid, stearic acid, palmitic acid, myristic acid or lauric acid; higher alcohol waxes, preferably stearyl alcohol or behenyl alcohol; hydroxystearic acid waxes, preferably 12-hydroxystearic acid or 12-hydroxystearic acid derivatives; ketone waxes, preferably stearone or laurone; amine waxes, preferably dodecylamine, tetradecylamine or octadecylamine; ester waxes, preferably methyl stearate, octadecyl stearate, glycerol fatty ester, sorbitan fatty ester, propylene glycol fatty ester, ethylene glycol fatty ester or polyoxyethylene fatty ester; and polymer waxes, preferably α-olefin maleic anhydride copolymer wax; any of which may be used alone or in combination of two or more.

In the present invention, if the whole wax component in the hot-melt ink composition is in a too small content, properties of other additives may come out overall, and hence the ink composition may have a too high or unsettled melting point to tend to make the ink composition not sharply melt at ink-jetting temperature. If they are in a too large quantity, the ink composition may have an insufficient melt viscosity, so that it may adhere to printing paper with difficulty. Hence, they may preferably be in a content of from 20% to 80% by weight, and more preferably from 30% to 70% by weight, based on the total weight of the ink composition.

In the case when the bisamide wax is contained as the wax component, the hot-melt ink composition may not obtain sufficient clearness and adhesive properties if the bisamide wax in the whole wax component is in a too small content, and the melting point of the hot-melt ink composition may become difficult to be controlled if it is in a too large content. Hence, the bisamide wax may preferably be in a content of from 5% to 60% by weight, and more preferably from 10% to 50% by weight. in the case when the maleic anhydride modified wax is contained as the wax component, improvements in clearness of the hot-melt ink composition itself and in print quality on an OHP sheet may not be expected if the maleic anhydride modified wax in the whole wax component is in a too small content, and the hot-melt ink composition may become fragile and an improvement of print quality to an OHP sheet may not be expected if it is in a too large content. Hence, the maleic anhydride modified wax may preferably be in a content of from 1% to 70% by weight, and more preferably from 5% to 60% by weight.

The amide resin used in the present invention is a component that improves the adhesive properties of the ink composition to printing paper and also controls the melt viscosity of the ink composition. The amide resin is also a component that restrains the wax component from crystallizing, and also imparts a transparency to the ink composition, and still also promotes steric hindrance of pigments.

As the amide resin, an amide resin may be used which has a weight-average molecular weight of preferably from 500 to 500,000, more preferably from 600 to 400,000, and particularly preferably from 700 to 300,000, as measured by gel permeation chromatography or programed-temperature gas chromatography, the former employing a differential refractometer as a detector and the latter employing a thermal conductometer as a detector.

If the amide resin in the ink composition is in a too small content, the ink composition can not ensure a sufficient melt viscosity required in itself and also may have a low transparency. If it is in a too large content, the ink composition may have too high a melt viscosity to enable good ink ejection at operation temperature of ink-jet printer heads. Hence, the amide resin may preferably be in a content of from 5% to 60% by weight, and more preferably from 10% to 50% by weight.

As the colorant used in the present invention, any dyes or pigments may be used so long as they are those conventionally used in oil-based ink compositions. As to the pigments, those commonly used in the technical field of printing may be used without regard to organic or inorganic. Stated specifically, the pigments may include conventionally known pigments as exemplified by carbon black, cadmium red, molybdenum red, chromium yellow, cadmium yellow, titanium yellow, chromium oxide, viridian, titanium cobalt green, ultramarine blue, Prussian blue, cobalt blue, azo pigments, phthalocyanine pigments, quinacridone pigments, isoindolinone pigments, dioxadine pigments, threne pigments, perylene pigments, perynone pigments, thioindigo pigments, quinopthalone pigments, and metal complex pigments, any of which may be used without any particular limitations.

As to the dyes, oil-soluble dyes are preferred, such as azo dyes, metal complex dyes, naphthol dyes, anthraquinone dyes, indigo dyes, carbonium dyes, quinoneimine dyes, xanthene dyes, cyanine dyes, quinoline dyes, nitro dyes, nitroso dyes, benzoquinone dyes, naphthoquinone dyes, naphthalimide dyes, penoline dyes and phthalocyanine dyes.

Any of these dyes and pigments may be used in combination, and may be used in an amount of from 0.1% to 10% by weight based on the weight of the ink composition, preferably from 0.5% to 8% by weight taking account of color forming performance of the printer, and more preferably from 0.7 to 5% by weight in order not to cause the deposition of dyes from the ink composition or aggregation of pigments that may be caused by thermal changes when the printer is operated.

The hot-melt ink composition of the present invention as described above can be produced by mixing, with mechanical stirring, the above essential components and the optional components added as occasion calls, and filtering the resulting mixture with a membrane filter or the like to remove unsolved matter.

The hot-melt ink composition of the present invention is useful as hot-melt inks used in ink-jet recording processes of various types in which the hot-melt ink composition is jetted to a recording medium in the form of droplets to make a record. It is especially suited for an ink-jet recording process in which the hot-melt ink composition is jetted in the form of droplets by utilizing the vibration of a piezoelectric device.

EXAMPLES

The present invention will be described below in greater detail by giving Examples. The present invention is by no means limited to these Examples.

Example 1

Room-temperature solid waxes used as vehicles in the present Example are stearic acid amide (Fatty Acid Amide S, available from Kao Corporation), methylenebissteraric acid amide (BISAMIDE, trade name; available from Nippon Kasei Chemical Co., Ltd.), and an α-olefin maleic anhydride copolymer (POWAX, trade name; available from Nippon Oil Co., Ltd.). As the amide resin, SUNMIDE 550 (trade name, available from Sanwa Chemical Industries, Ltd.) is used, and as the dye, an oil-soluble dye C.I. Solvent Yellow 162 (NEOPEN YELLOW 075, trade name; available from BASF Corp.).

| Ink formulation: | |
| --- | --- |
| Fatty Acid Amide S | 48% by weight |
| BISAMIDE | 15% by weight |
| POWAX | 15% by weight |
| SUNMIDE 550 | 20% by weight |
| NEOPEN YELLOW 075 | 2% by weight |

A hot-melt ink composition having the above formulation can be produced by a procedure as shown in FIG. 1.

Fatty Acid Amide S (2), BISAMIDE (4), POWAX (6) and SUNMIDE 550 (8) are heated and dissolved at a temperature of from 70° C. to 250° C., and preferably from 100° C. to 200° C., in approximation, and then NEOPEN YELLOW 075 (10) is mixed, which is mixed with stirring at from 200 to 10,000 r.p.m., and preferably from 500 to 5,000 r.p.m., by means of a dissolver (12). The ink composition (14) thus prepared is filtered with a 2 μm mesh filter (16) by means of a heat filtering apparatus manufactured by Toyo Roshi K.K., to obtain a final, hot-melt ink composition (18).

The hot-melt ink composition (18) thus prepared was melted on a hot plate heated to 110° C., and then coated on an OHP sheet (PP-2500, available from Sumitomo 3M Limited) using a wire-wound rod (winding wire diameter: 0.9 mm) As a result, a transparent ink film with a clear color was obtained. Its transparency was measured using a hazometer (haze meter) (manufactured by Suga Shikenki K.K.) to find that it was 21.7%.

The above ink composition was set in an ink-jet printer to print images. As a result, sharp printed images were obtained on recording paper without causing any clogging of the printer head. It was also possible to print images well on OHP sheets, to obtain sharp projection images.

Example 2

Room-temperature solid waxes used as vehicles in the present Example are stearyl erucic acid amide (NIKKAMIDE SE, trade name; available from Nippon Kasei Chemical Co., Ltd.), ethylenebisoleic acid amide (SLIPAX O, trade name; available from Nippon Kasei Chemical Co., Ltd.), and an α-olefin maleic anhydride copolymer (POWAX, trade name; available from Nippon Oil Co., Ltd.). As the amide resin, BIRTHAMIDE 335 (trade name, available from Henkel Hakusui Corporation) is used, and as the dye, an oil-soluble dye C.I. Solvent Blue70 (NEOPEN BLUE 808, tradename; available from BASF corp.).

| Ink formulation: | |
| --- | --- |
| NIKKAMIDE SE | 49% by weight |
| SLIPAX O | 10% by weight |
| POWAX | 15% by weight |
| BIRTHAMIDE 335 | 24% by weight |
| NEOPEN BLUE 808 | 2% by weight |

A hot-melt ink composition having the above formulation can be produced by the same procedure as in Example 1. The above NIKKAMIDE SE, SLIPAX O, POWAX and BIRTHAMIDE 335 are heated and dissolved at a temperature of from 70° C. to 250° C., and preferably from 100° C. to 200° C., in approximation, and then NEOPEN BLUE 808 is mixed, which is mixed with stirring at from 200 to 10,000 r.p.m., and preferably from 500 to 5,000 r.p.m., by means of the dissolver mentioned above. The ink composition thus prepared is filtered with a 2 μm mesh filter by means of a heat filtering apparatus manufactured by Toyo Roshi K.K., to obtain a final, hot-melt ink composition.

The hot-melt ink composition thus prepared was melted on a hot plate heated to 110° C., and then coated on an OHP sheet (PP-2500, available from Sumitomo 3M Limited) using a wire-wound rod (winding wire diameter: 0.9 mm). As a result, a transparent ink film with a clear color was obtained. Its transparency was measured using a hazometer (haze meter) (manufactured by Suga Shikenki K.K.) to find that it was 17.7%.

The above ink composition was set in an ink-jet printer to print images. As a result, sharp printed images were obtained on recording paper without causing any clogging of the printer head. It was also possible to print images well on OHP sheets, to obtain sharp projection images.

Example 3

The ink composition in present Example has formulation as shown below.

| Ink formulation: | |
| --- | --- |
| Fatty Acid Amide S | 53% by weight |
| BISAMIDE | 25% by weight |
| SUNMIDE 550 | 20% by weight |
| NEOPEN YELLOW 075 | 2% by weight |

A hot-melt ink composition of the present Example can be produced by a procedure as shown below.

The above Fatty acid amide S, BISAMIDE and SUNMIDE 550 are heated and dissolved at a temperature of from 70° C. to 250° C., and preferably from 100° C. to 200° C., in approximation, and then NEOPEN YELLOW 075 is mixed, which is mixed with stirring at from 200 to 10,000 r.p.m., and preferably from 500 to 5,000 r.p.m., by means of the dissolver mentioned above. The ink composition thus prepared is filtered with a 2 μm mesh filter by means of a heat filtering apparatus manufactured by Toyo Roshi K.K., to obtain a final, hot-melt ink composition.

The hot-melt ink composition thus prepared was melted on a hot plate heated to 110° C., and then coated on an OHP sheet (PP-2500, available from Sumitomo 3M Limited) using a wire-wound rod (winding wire diameter: 0.9 mm). As a result, an ink film having a transparency was obtained. Its transparency was measured using a hazometer (haze meter) (manufactured by Suga Shikenki K.K.) to find that it was 30.6%.

The above ink composition was set in an ink-jet printer to print images. As a result, sharp printed images were obtained on recording paper without causing any clogging of the printer head. When printed on OHP sheets, although not so sharp as the instances of the ink compositions of Examples 1 and 2, containing both the bisamide wax and the maleic anhydride modified wax, printed images having a transparency and well feasible for practical use were obtained.

Example 4

Room-temperature solid waxes used as vehicles in the present Example are stearic acid amide (Fatty Acid Amide S, available from Kao Corporation) and an α-olefin maleic anhydride copolymer (POWAX, trade name; available from Nippon Oil Co., Ltd.). As the amide resin, SUNMIDE 550 (trade name, available from Sanwa Chemical Industries, Ltd.) is used, and as the dye, an oil-soluble dye C.I. Solvent Yellow 162 (NEOPEN YELLOW 075, trade name; available from BASF Corp.).

| Ink formulation: | |
| --- | --- |
| Fatty Acid Amide S | 50% by weight |
| POWAX | 20% by weight |
| SUNMIDE 550 | 28% by weight |
| NEOPEN YELLOW 075 | 2% by weight |

A hot-melt ink composition having the above formulation can be produced by the same procedure as in Example 1. The above Fatty Acid Amide S, POWAX and SUNMIDE 550 are heated and dissolved at a temperature of from 70° C. to 250° C., and preferably from 100° C. to 200° C., in approximation, and then NEOPEN YELLOW 075 is mixed, which is mixed with stirring at from 200 to 10,000 r.p.m., and preferably from 500 to 5,000 r.p.m., by means of the dissolver mentioned above. The ink composition thus prepared is filtered with a 2 μm mesh filter by means of a heat filtering apparatus manufactured by Toyo Roshi K.K., to obtain a final, hot-melt ink composition.

The hot-melt ink composition thus prepared was melted on a hot plate heated to 100° C., and then coated on an OHP sheet (PP-2500, available from Sumitomo 3M Limited) using a wire-wound rod (winding wire diameter: 0.9 mm). As a result, an ink film having a transparency was obtained. Its transparency was measured using a hazometer (haze meter) (manufactured by Suga Shikenki K.K.) to find that it was 27.8%.

The above ink composition was set in an ink-jet printer to print images. As a result, sharp printed images were obtained on recording paper without causing any clogging of the printer head. When printed on OHP sheets, although not so sharp as the instances of the ink compositions of Examples 1 and 2, containing both the bisamide wax and the maleic anhydride modified wax, printed images having a transparency and good printed images well feasible for practical use were obtained.

Comparative Example 1

The ink composition in present Comparative Example has formulation as shown below.

| Ink formulation: | |
| --- | --- |
| Fatty Acid Amide S | 53% by weight |
| NIKKAMIDE SE | 21% by weight |
| BIRTHAMIDE 335 | 24% by weight |
| NEOPEN BLUE 808 | 2% by weight |

A hot-melt ink composition of the present Comparative Example can be produced by a procedure as shown below.

The above Fatty acid amide S, NIKKAMIDE SE and BIRTHAMIDE 335 are heated and dissolved at a temperature of from 700° C. to 250° C., and preferably from 100° C. to 200° C., in approximation, and then NEOPEN BLUE 808 is mixed, which is mixed with stirring at from 200 to 10,000 r.p.m., and preferably from 500 to 5,000 r.p.m., by means of the dissolver mentioned above. The ink composition thus prepared is filtered with a 2 μm mesh filter by means of a heat filtering apparatus manufactured by Toyo Roshi K.K., to obtain a final, hot-melt ink composition.

The hot-melt ink composition thus prepared was melted on a hot plate heated to 110° C., and then coated on an OHP sheet (PP-2500, available from Sumitomo 3M Limited) using a wire-wound rod (winding wire diameter: 0.9 mm). As a result, an ink film having no transparency was obtained. Its transparency was measured using a hazometer (haze meter) (manufactured by Suga Shikenki K.K.) to find that it was 54.6%.

The above ink composition was set in an ink-jet printer to print images. As a result, sharp printed images were obtained on recording paper without causing any clogging of the printer head. However, when printed on OHP sheets, prints having almost no transparency were obtained.

The entire disclosure of Japanese Patent Application No. 8-72210 filed on Mar. 27, 1996 including specification, claims, figure and summary is incorporated herein by reference in its entirety.

What is claimed is:

1. A hot-melt ink composition which is solid at room temperature, used for hot-melt ink-jet recording; said ink composition comprising a wax component having a melting point of from 50° C. to 150° C., an amide resin and a colorant; said wax component comprises both of bisamide wax and a maleic anhydride modified wax.

2. The hot-melt ink composition according to claim 1, wherein said bisamide wax is at least one selected from the group consisting of methylenebisstearic acid amide, ethylenebisstearic acid amide, ethylenebisisostearic acid amide, ethylenebishydroxystearic acid amide, hexamethylenebisbehenic acid amide, hexamethylenebishydroxystearic acid amide, N,N'-distearyladipinic acid amide, N,N'-distearylsebacic acid amide, ethylenebisoleic acid amide, hexamethylenebisoleic acid amide, N,N'-dioleyladipic acid amide, and N,N'-dioleylsebacic acid amide.

3. The hot-melt ink composition according to claim 1, wherein said maleic anhydride modified wax is an α-olefin maleic anhydride copolymer.

4. The hot-melt ink composition according to claim 1, wherein said bisamide wax is methylenebisstearic acid amide or ethylenebisisoleic acid amide, and said maleic anhydride modified wax is an α-olefin maleic anhydride copolymer.

5. The hot-melt ink composition according to claim 1, wherein said wax component is contained in an amount of from 20% by weight to 80% by weight, said amide is contained in an amount of from 5% to 60% by weight, and said colorant is contained in an amount of from 0.1% to 10% by weight.

6. The hot-melt ink composition according to claim 1, wherein said wax component is contained in an amount of from 30% to 70% by weight, said amide is contained in an amount of from 10% to 50% by weight, and said colorant is contained in an amount of from 0.5% to 8% by weight.

7. The hot-melt ink composition according to claim 1, wherein said bisamide wax is contained in an amount of from 5% to 60% by weight based on the total weight of the wax component.

8. The hot-melt ink composition according to claim 7, wherein said bisamide wax is contained in an amount of from 10% to 50% by weight based on the total weight of the wax component.

9. The hot-melt ink composition according to claim 1, wherein said maleic anhydride modified wax is contained in an amount of from 1% to 70% by weight based on the total weight of the wax component.

10. The hot-melt ink composition according to claim 9, wherein said maleic anhydride modified wax is contained in an amount of from 5% to 60% by weight based on the total weight of the wax component.

11. The hot-melt ink composition according to claim 1, wherein said amide resin has a weight average molecular weight of from 500 to 500,000.

12. The hot-melt ink composition according to claim 1, wherein said amide resin has a weight average molecular weight of from 600 to 400,000.

13. The hot-melt ink composition according to claim 1, wherein said amide resin has a weight average molecular weight of from 700 to 300,000.

14. The hot-melt ink composition according to claim 1, wherein said wax component further has a wax selected from the group consisting of a petroleum wax, a vegetable wax, an animal wax, a mineral wax, a synthetic hydrocarbon wax, a hydrogenated wax, a modified wax, a higher fatty acid wax, a higher alcohol wax, a hydroxystearic acid wax, a ketone wax, an amine wax, an ester wax and a polymer wax.

15. An ink-jet recording process comprising jetting a hot-melt ink composition to a recording medium in the form of droplets to make a record; said hot-melt ink composition, which is solid at room temperature, comprising a wax component having a melting point of from 50° C. to 150° C., an amide resin and a colorant; said wax component comprises both a bisamide wax and a maleic anhydride modified wax.

16. The ink-jet recording process according to claim 15, wherein said hot-melt recording ink composition is jetted by utilizing the vibration of a piezoelectric device.

* * * * *